United States Patent
Logan et al.

(10) Patent No.: US 10,047,274 B2
(45) Date of Patent: Aug. 14, 2018

(54) APPARATUS AND METHOD FOR INVERTING POLYMER LATICES

(71) Applicant: Ecolab USA Inc., St. Paul, MN (US)

(72) Inventors: Zachary Wilson Logan, Bar Nunn, WY (US); William J. Andrews, Parker, CO (US); Kerry C. Brinkman, Naperville, IL (US); Peter E. Reed, Plainfield, IL (US); Warren T. Gillenwater, Glen Ellyn, IL (US); Heinrich Bode, Aurora, IL (US); Martin David Biggs, Aurora, CO (US)

(73) Assignee: Ecolab USA Inc., St. Paul, MN (US)

( * ) Notice: Subject to any disclaimer, the term of this patent is extended or adjusted under 35 U.S.C. 154(b) by 72 days.

(21) Appl. No.: 15/152,852

(22) Filed: May 12, 2016

(65) Prior Publication Data
US 2016/0333253 A1 Nov. 17, 2016

Related U.S. Application Data

(60) Provisional application No. 62/160,700, filed on May 13, 2015.

(51) Int. Cl.
*C09K 8/588* (2006.01)
*C02F 1/68* (2006.01)
(Continued)

(52) U.S. Cl.
CPC ............ *C09K 8/588* (2013.01); *B01F 3/0865* (2013.01); *B01F 5/045* (2013.01); *B01F 5/0471* (2013.01);
(Continued)

(58) Field of Classification Search
CPC ...... C02F 1/54; C02F 1/5227; C02F 2103/28; C02F 2301/024; C02F 1/686;
(Continued)

(56) References Cited

U.S. PATENT DOCUMENTS 3,724,547 A * 4/1973 Bott ..................... C09K 8/588
166/270.1
3,862,060 A * 1/1975 Anderson ................ C08G 8/08
524/25

(Continued)

FOREIGN PATENT DOCUMENTS

EP 1437173 B1 1/2006

OTHER PUBLICATIONS

The International Search Report and Written Opinion dated Aug. 9, 2016 in connection with International Patent Application No. PCT/US2016/032130 (10 pages).

*Primary Examiner* — Tony G Soohoo
(74) *Attorney, Agent, or Firm* — Kagan Binder, PLLC

(57) ABSTRACT

Disclosed herein are inversion systems and methods of diluting w/o lattices including about 10 wt % to 80 wt % of a water soluble polymer. Using the inversion systems and methods described herein, dilution of w/o lattices is carried out in a single step to form dilute lattices having 10,000 ppm or less polymer; the dilute lattices form polymer solutions with no further addition of mixing force or water. The solution viscosities of the polymer solutions obtained using the systems and methods of the invention are at least about 80% of solution viscosity expected in the absence of shear.

17 Claims, 8 Drawing Sheets

(51) Int. Cl.
  *C02F 1/54*   (2006.01)
  *B01F 3/08*   (2006.01)
  *B01F 5/00*   (2006.01)
  *B01F 5/04*   (2006.01)
  *B01F 3/00*   (2006.01)

(52) U.S. Cl.
  CPC .............. *B01F 5/0498* (2013.01); *C02F 1/54* (2013.01); *C02F 1/686* (2013.01); *B01F 2003/005* (2013.01); *B01F 2003/0884* (2013.01); *B01F 2003/0896* (2013.01); *B01F 2005/0017* (2013.01); *B01F 2215/0052* (2013.01); *B01F 2215/0081* (2013.01)

(58) Field of Classification Search
  CPC ...... C09K 8/588; B01F 5/0498; B01F 5/0471; B01F 5/045; B01F 3/0865; B01F 2215/0081; B01F 2003/0884; B01F 2003/0896; B01F 2215/0052; B01F 2003/005; B01F 2005/0017
  USPC .................................................. 523/336, 925
  See application file for complete search history.

(56) References Cited

U.S. PATENT DOCUMENTS

| | | | | | |
|---|---|---|---|---|---|
| 4,021,394 | A * | 5/1977 | Tuka | ........................ | C08G 12/46 523/336 |
| 4,022,731 | A * | 5/1977 | Schmitt | ............... | B01F 17/0028 523/336 |
| 4,022,736 | A * | 5/1977 | Schmitt | ............... | B01F 17/0028 523/337 |
| 4,022,741 | A * | 5/1977 | Tuka | ........................ | C08F 8/32 523/336 |
| 4,028,897 | A * | 6/1977 | Bennett | .................... | C08L 21/02 405/265 |
| 4,034,809 | A * | 7/1977 | Phillips | .................... | C09K 8/588 166/270.1 |
| 4,035,347 | A * | 7/1977 | Korzenski | ............... | C08F 20/56 526/207 |
| 4,115,340 | A * | 9/1978 | Ellwanger | ............... | C08F 20/56 523/336 |
| 4,147,681 | A * | 4/1979 | Lim | ........................ | C02F 1/54 162/168.3 |
| 4,218,147 | A * | 8/1980 | Rosenberger | ............. | B01F 3/08 366/162.1 |
| 4,642,222 | A * | 2/1987 | Brazelton | ............ | G05D 11/139 137/101.21 |
| 4,747,691 | A * | 5/1988 | Hoffland | ............... | B01F 3/0853 366/160.2 |
| 5,061,456 | A * | 10/1991 | Brazelton | ............ | C02F 1/5227 366/172.2 |
| 5,067,508 | A * | 11/1991 | Lee | ........................... | F17D 1/17 137/13 |
| 5,124,376 | A * | 6/1992 | Clark, Jr. | .................... | C08J 3/03 523/336 |
| 5,135,968 | A * | 8/1992 | Brazelton | ............. | B01F 3/0807 366/165.2 |
| 5,165,440 | A * | 11/1992 | Johnston | .................... | B29B 7/32 137/13 |
| 5,316,031 | A * | 5/1994 | Brazelton | ............. | B01F 3/0807 137/1 |
| 5,338,779 | A * | 8/1994 | Brazelton | ............. | B01F 3/1207 366/165.1 |
| 5,388,905 | A * | 2/1995 | Ake | ....................... | B01F 3/0861 137/13 |
| 5,470,150 | A * | 11/1995 | Pardikes | ................. | B01F 3/088 137/565.15 |
| 5,480,921 | A * | 1/1996 | Hunter | ....................... | C08F 6/20 523/331 |
| 5,529,392 | A * | 6/1996 | O'Donnell | .............. | B01F 3/088 366/155.1 |
| 5,589,525 | A * | 12/1996 | Hunter | ..................... | B01D 1/22 159/13.1 |
| 5,762,416 | A * | 6/1998 | LeSire | .................... | B01F 5/043 366/136 |
| 5,913,324 | A * | 6/1999 | Signer | ................... | B01F 5/0471 137/3 |
| 6,110,995 | A * | 8/2000 | Hunter | ....................... | C08F 6/20 210/787 |
| 6,485,651 | B1 * | 11/2002 | Branning | ............ | B01F 17/0021 210/702 |
| 7,311,146 | B1 * | 12/2007 | Hanes, Jr. | ................ | C09K 8/68 166/279 |
| 7,504,366 | B2 * | 3/2009 | Hanes, Jr. | ................ | C09K 8/68 137/13 |
| 7,550,060 | B2 * | 6/2009 | Jacobson | .............. | B01F 5/0077 162/158 |
| 7,785,442 | B2 * | 8/2010 | Jacobson | .............. | B01F 5/0077 162/158 |
| 8,383,560 | B2 * | 2/2013 | Pich | ...................... | B01F 1/0005 166/90.1 |
| 9,822,297 | B2 * | 11/2017 | Brinkman | .............. | C09K 8/588 |
| 2007/0133346 | A1 * | 6/2007 | Jacobson | .............. | B01F 3/0865 366/160.2 |
| 2009/0139676 | A1 * | 6/2009 | Todorovic | ............. | B01F 5/0077 162/164.6 |
| 2014/0124153 | A1 * | 5/2014 | Granger | ................ | D21H 27/005 162/164.6 |
| 2016/0333253 | A1 * | 11/2016 | Logan | ..................... | C09K 8/588 |

\* cited by examiner

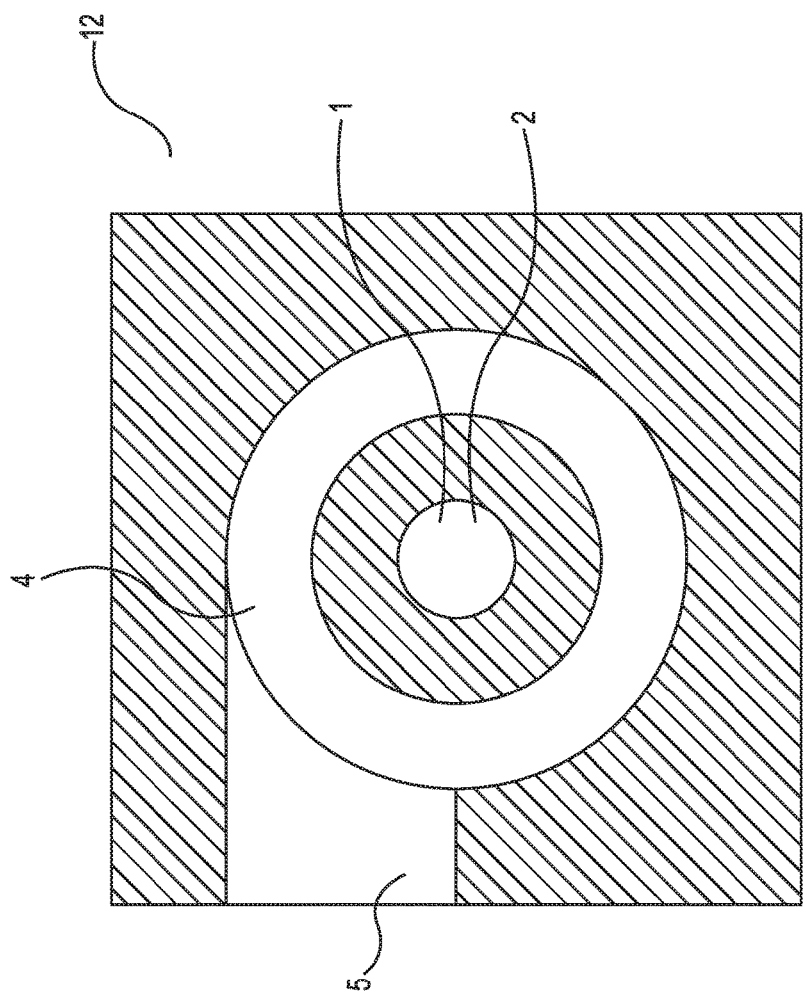

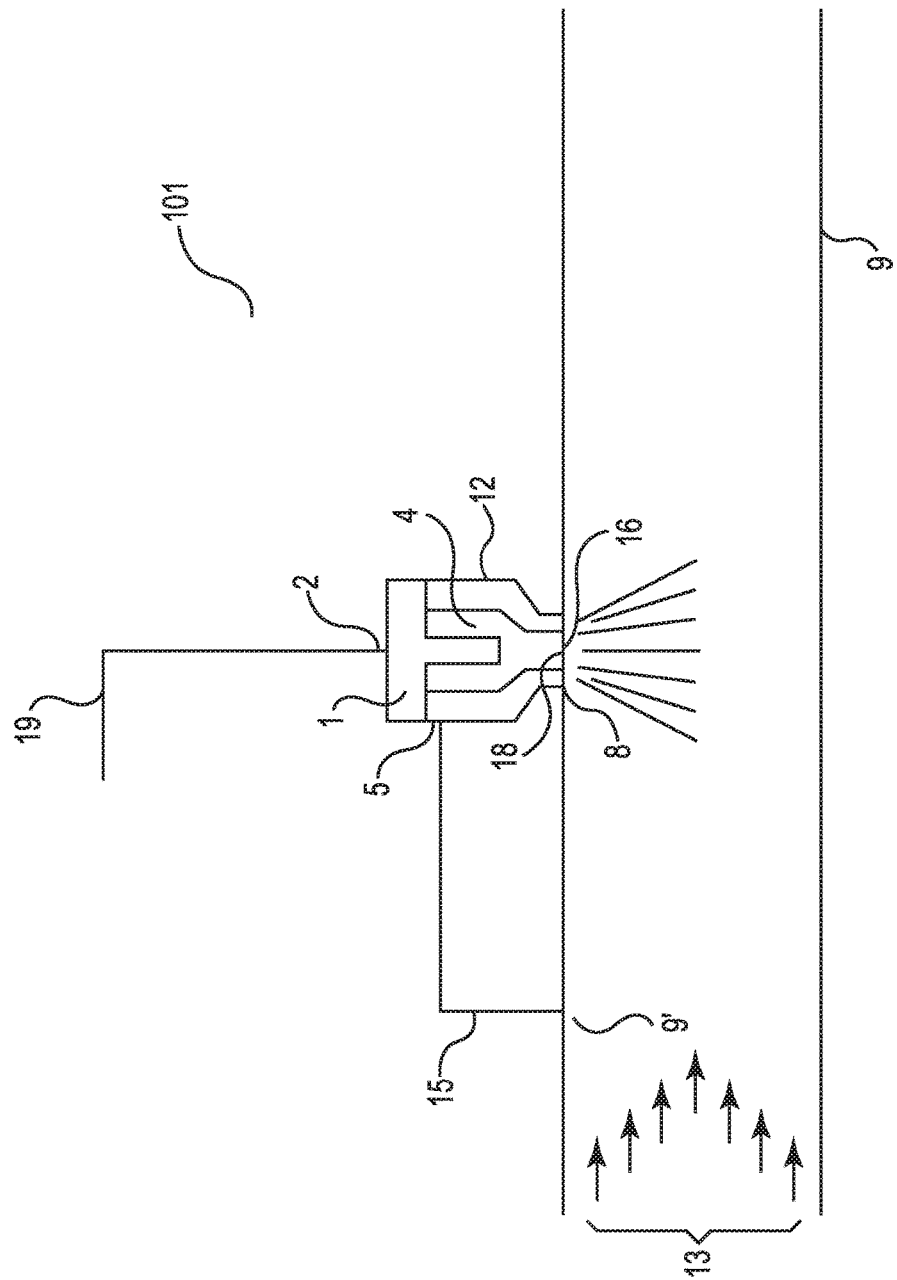

APPARATUS AND METHOD FOR INVERTING POLYMER LATICES

TECHNICAL FIELD

The invention relates to apparatuses and methods for rapid inversion of water-in-oil polymer lattices to form polymer flooding solutions for enhanced oil recovery.

BACKGROUND

Crude oil development and production can include up to three distinct phases: primary, secondary, and tertiary (or enhanced) recovery. During primary recovery, the natural pressure of the reservoir or gravity drives oil into the wellbore, combined with artificial lift techniques (such as pumps) which bring the oil to the surface. But only about 10 percent of a reservoir's original oil in place is typically produced during primary recovery. Secondary recovery techniques extend a field's productive life generally by injecting water or a gas to displace oil and drive it to a production wellbore, resulting in the recovery of 20 to 40 percent of the original oil in place.

Enhanced oil recovery, or EOR, is a generic term encompassing techniques for increasing the amount of crude oil that can be extracted from a subterranean formation such as an oil field. EOR techniques offer prospects for ultimately producing 30% to 60% or more of the reservoir's original oil in place. Of these techniques, polymer flooding is particularly favored. Polymer flooding is generally accomplished by dissolving the selected polymer in water, and injecting the polymer solution into the reservoir.

However, since the target concentration of polymer in the solutions is typically about 10,000 ppm (1 wt %) or less, transport at the target concentration is not economically efficient. Transporting the dried polymers, while economically efficient, is sometimes not favorable for field use due to difficulties in fully hydrating the dry polymers in the field. To address these issues, various formulations have been developed to allow economically feasible transportation and storage. Specialized methods have also been developed to convert the formulations to use concentrations of fully hydrated polymers in the field.

Organic polymers traditionally used in EOR include water soluble polymers such as polyacrylamides, polyacrylates, copolymers thereof and copolymers of these with acrylamidomethylpropane sulfonic acid, ammonium functional monomers such as DADMAC (N,N'-diallyl-N,N'-dimethylammonium chloride), as well as hydrophobically modified versions of these, also called associative polymers or associative thickeners. Associative thickeners typically include about 1 mole % or less of a hydrophobic monomer such as a $C_8$-$C_{16}$ linear or branched ester of acrylic acid or N-alkyl adduct of acrylamide. The most commonly employed polymer for EOR is a copolymer of 70 mole % acrylamide and 30 mole % acrylic acid.

The EOR polymers are deliverable as powder, as a concentrate such as a 20 wt % polyacrylamide gel, or in the water phase of a water-in-oil (w/o) latex. Of these formats, water-in-oil lattices have the advantage of being deliverable in a liquid format that is easily handled in the field because the latex viscosity is lower than that of a water solution of comparable wt % polymer. Typically, such lattices include about 10 wt % to 80 wt % polymer solids, yet have a latex viscosity of less than about 2000 cP. Latex polymers are favored for use in offshore applications and other relatively isolated operations due to the ease of use and relatively simple equipment requirements.

Commercial w/o lattices are formulated for EOR by dissolving monomer in a high-solids aqueous solution to form a water phase, mixing a hydrocarbon solvent and a surfactant having a hydrophilic-lipophilic balance (HLB) of about 2 to 8 to form an oil phase, mixing the two phases using techniques that result in a water-in-oil emulsion or latex, and polymerizing the monomer via a free-radical azo or redox mechanisms. After polymerization is complete, a higher HLB surfactant (HLB>8) is often added as a destabilizer to facilitate latex inversion when water is added. "Inversion" is a term of art in EOR to describe the dilution of w/o lattices with a water source, causing destabilization of the latex and subsequent dissolution of the concentrated polymer particles to full hydrodynamic volume and maximum solution viscosity.

In EOR applications, it is a goal of field operators to achieve continuous inversion and hydration of w/o lattices to reach the target polymer solution concentration before the injection mixture reaches the reservoir rockface. In offshore EOR applications, the transit time between the topside mixing of the polymer with the injection water and the injection into the reservoir rock can range from about 5 minutes to about 180 minutes. In such applications, the final target concentration of the polymer solution is about 500 to 10,000 ppm (0.05 wt % to 1 wt %) in a pipe in line. However, inversion of conventional lattices at concentrations below 1 wt % is problematic. There exists a concentration effect in which w/o latex polymers invert more efficiently at target concentrations of about 1 wt % polymer or more. This is especially true in high temperature condition, high total dissolved solids conditions, or in both such conditions. When a typical anionic latex polymer is inverted at 1000 ppm in tapwater, for example, full solution viscosity cannot be reached even after several hours of stirring in the laboratory. Actual industrial conditions are much less favorable for reaching target concentrations of 1 wt % or less of fully inverted and hydrated polymer solutions in a 5-180 minute time frame.

Further, there is increasingly the need to address polymer flooding in challenging conditions encountered in reservoirs wherein ambient or produced water source contacted by the polymer includes high total dissolved solids, such as total dissolved solids of up to about 30 wt %. Another need is to address reservoirs where the available water source is present at an elevated temperature, such as 60° C. to 200° C. In some cases, the ambient or produced water source is both high total solids and is present at a high temperature. Field operators strongly prefer to use ambient or produced water sources rather than purified water sources. However, use of such water sources lead to difficulties in dispersing the high molecular weight polymers to use concentrations. Inversion of w/o lattices in such water sources can result in slow inversion times and/or require multistage dilution and mixing procedures; it can also result in coagulation, precipitation, or gross phase separation of polymer upon or after contact of the latex with the diluted water environment. The products of such instability cause plugged equipment in the field and failure to accomplish mobility control within the reservoir. These problems remain largely unaddressed by conventional methods and equipment developed for inversion of w/o lattices in the field. Thus there is a need to address inversion of w/o lattices in field conditions where the use water source has high total dissolved solids, is present at high temperature, or both.

U.S. Pat. No. 8,383,560 describes a two-step inversion apparatus that is designed to take advantage of the concentration effect with latex polymer inversion. In the first step, a w/o polymer latex is diluted to yield a polymer solution having about 5000 ppm to 20,000 ppm polymer solids employing a first static mixer having a pressure drop of at least 2 bars between the inlet and outlet thereof. The shear associated with the pressure drop facilitates the dispersal of the w/o latex into fine droplets in the water. These droplets, with the aid of surfactants, then proceed to release the polymer particles into the water. In the second step after sufficient residence time, the partially diluted latex is combined with a second stream of water and applied to a second static mixer having a pressure drop of at least 1 bar between the inlet and outlet. This results in a polymer solution having between 500 and 3000 ppm, in practice between 1000 and 2000 ppm polymer solids. However, such two-stage inversion apparatuses still require a relatively large equipment footprint.

Thus, there is a need in the industry to develop devices for use in EOR applications wherein w/o latex inversion is carried out under conditions of restricted space and/or equipment weight allowances. There is a need in the industry to provide devices for accomplishing w/o latex inversion in a single step. There is a need in the industry for inversion equipment capable of enabling continuous inversion and hydration, in a total time of 180 minutes or less. There is a need in the industry to accomplish a single-step inversion process under harsh conditions such as use of water sources having high temperature, high total dissolved solids, or both.

SUMMARY

Described herein are inversion devices and inversion systems incorporating one or more inversion devices, wherein the inversion devices and methods of inversion are effective to achieve continuous or batch inversion of w/o lattices having about 10 wt % to 80 wt % polymer solids and about 2 wt % to 5 wt % of a surfactant having a hydrophilic/lipophilic balance (HLB) of at least about 14, in about 5 minutes or less to result in a dilute latex having less than about 10,000 ppm polymer solids. The dilute lattices form polymer solutions after a subsequent hydration period, wherein the polymer solutions are characterized by the substantial absence of gel particulates, as determined by filtration quotient (or Filter Ratio) of about 1.5 or less when measured using industry standard methods of filtration of a polymer solution or dilute latex having 1000 ppm polymer through a filter having a 5 µm pore size. In some embodiments, the inversion methods of the invention are characterized in that a single dilution step of a w/o latex is carried out to result in a polymer solution of 10,000 ppm or less.

The inversion systems of the invention include an in-line or bypass-mounted inversion device that is designed and adapted to provide a pressure differential (or pressure drop) of at about 2 psi to 150 psi between the inlet and outlet of the device. In some embodiments, the inversion device is a static mixer or mixing pump. In some embodiments the inversion devices are characterized by the absence of mixing elements such as blades, vanes, paddles and the like, such as those required for operability of conventional dynamic or static mixers. In some embodiments, the inversion device comprises, consists essentially of, or consists of a device as described in U.S. Pat. No. 7,785,442, the contents of which are incorporated herein by reference in its entirety.

The inversion system comprises at least one inversion device. In some embodiments, the inversion system is characterized as having a single inversion device and no further mixing devices. In some embodiments, the inversion system comprises a single inversion device characterized by the absence of mixing elements and one or more additional mixing devices selected from static mixers and pumps. In some embodiments, the inversion system further comprises one or more elements of process infrastructure situated upstream or downstream of the inversion device. In some such embodiments, a process infrastructure element is in fluid communication with the inversion device. In some embodiments, the process infrastructure elements impart additional mixing energy directed to one or more inversion processes.

BRIEF DESCRIPTION OF THE DRAWINGS

FIG. 6B is a schematic cross sectional illustration of the inversion device of FIG. 6A.

FIG. 9 is a schematic illustration of another system for inverting a latex according to an embodiment of the present invention.

DETAILED DESCRIPTION

Definitions

Figure 2:
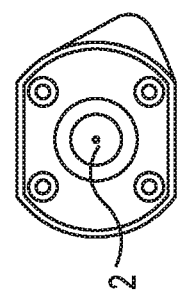
FIG. 2 is a topview of the device of FIG. 1.
Figure 4:
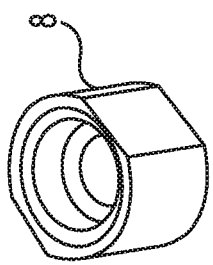
FIG. 4 is a side elevation view of the adaptor of the device of FIG. 1.
Figure 1:
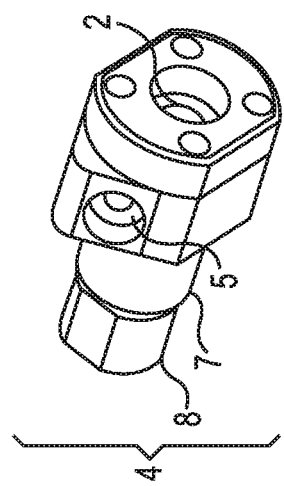
FIG. 1 is a side elevation view of an inversion device according to one embodiment of the present invention.
Figure 3:
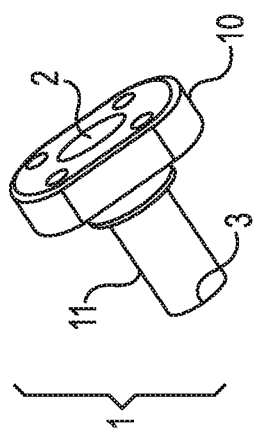
FIG. 3 is a side elevation view of the first conduit of the device of FIG. 1.
Figure 5:
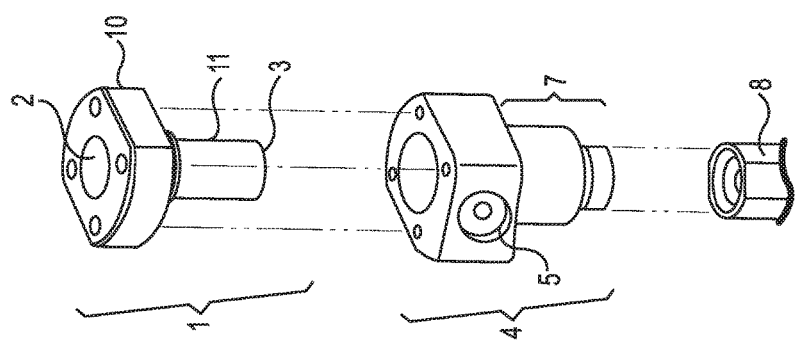
FIG. 5 is an exploded side elevation view of the first conduit, second conduit, chamber and adaptor of an inversion device of the present invention.

As used herein, the term "water source" means a source of water comprising, consisting essentially of, or consisting of fresh water, deionized water, distilled water, produced water, municipal water, waste water such as runoff water or municipal waste water, treated or partially treated waste water, well water, brackish water, "gray water", sea water, or a combination of two or more such water sources as determined by context. In some embodiments, a water source includes one or more salts, ions, buffers, acids, bases, surfactants, or other dissolved, dispersed, or emulsified compounds, materials, components, or combinations thereof. In some embodiments, a water source includes about 0 wt % to 30 wt % total dissolved non-polymeric solids. The terms "aqueous", "waterbased", or "water solution" generally refer to a composition including a water source listed herein. Generally and as determined by context, the term "water source" includes high total dissolved solids water sources, high temperature water sources, and water sources that are both high total dissolved solids and high temperature water sources.

As used herein, the term "high temperature" means about 60° C. to 200° C., as specified or determined by context.

As used herein, the term "high total dissolved solids" refers to a water source having at least 0.5 wt % non-polymeric solids dissolved therein, and in embodiments up to about 30 wt % non-polymeric solids dissolved therein. In general, "saline" or "salinity" refers to a water source wherein a portion, in some embodiments a substantial portion, the total dissolved solids are salts, as determined by context.

As used herein, the term "mixing element" means baffle elements within a static mixer, such as plates, helices, vanes, paddes, or blades, intended to disrupt laminar flow and cause mixing within the static mixer; or vanes, paddles, blades, screw elements, or other elements of dynamic mixers such as rotating or corotating screw mixers, planetary and double planetary mixers, cell disruptors, impellers, and the like.

As used herein, the terms "latex", including "water-in-oil latex", "polymer latex", "w/o latex", or "inverse emulsion polymer" and related terms mean a discontinuous internal water phase within a continuous oil phase, wherein the water phase includes at least one water soluble polymer present at about 10 wt % to 80 wt % of the latex. Water soluble polymers are characterized as having a majority, that is more than 50 mole %, of repeat units derived from one or more water soluble monomers such as acrylamide, acrylic acid or a salt thereof, 2-acrylamido-2-methylpropane sulfonic acid or a salt thereof, a diallyldimethylammonium halide, or another water soluble monomer. In some embodiments the water soluble polymer further includes a minor amount, such as less than about 10 wt %, of repeat units derived from one or more water insoluble monomers. In some embodiments, a latex is an invertible latex.

As used herein, the term "invertible latex" means a w/o latex wherein a surfactant having an HLB of about 14 or greater is further added to the polymer latex to facilitate inversion. In some embodiments, an invertible latex includes about 2.5 wt % to 5 wt %, based on the weight of the latex, of the surfactant having an HLB of about 14 or greater.

As used herein, the term "inversion time" or related terms means the time between contact of a water source with a w/o latex, and subsequent formation of a dilute latex.

As used herein, the term "dilute latex" or related terms means a w/o latex that is completely dispersed in a water source in the form of fine droplets in an amount that provides about 10,000 ppm (1 wt %) or less of water soluble polymer.

As used herein, the verbs "dilute" or "invert" mean to add a sufficient amount of a water source to a latex to provide a dilute latex.

As used herein, the term "hydration" refers to a process that includes the sequestration of the dilute latex oil phase into micelles with the aid of surfactants, the release of the polymer particles into the water, the swelling of the polymer to form hydrogel particles, and the disentangling of the hydrogel into individual polymer chains.

As used herein, the term "hydration period" refers to the period of time between forming a dilute latex and achieving a polymer solution. In some embodiments, the hydration period is characterized by the absence of mixing operations.

As used herein, the term "polymer solution" means a dilute latex wherein the Filter Ratio (FR) test gives a value of about 1.5 or less when measured using industry standard methods for filtration of a dilute latex or polymer solution having 1000 ppm polymer through a filter having a 5 μm pore size. In some embodiments, a polymer solution is characterized as a having achieved its maximum viscosity. In some embodiments, a polymer solution is achieved by contacting the latex with the water source to form a dilute latex and allowing the dilute latex to remain contacted for a hydration period.

As used herein, the term "optional" or "optionally" means that the subsequently described component, event or circumstance may but need not be present or occur. The description therefore discloses and includes instances in which the event or circumstance occurs and instances in which it does not, or instances in which the described component is present and instances in which it is not.

As used herein, the term "about" modifying, for example, the quantity of an ingredient in a composition, concentration, volume, temperature, time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, through standard operating machine error, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents according to this definition. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

Inversion Device

In some embodiments, the inversion systems of the invention comprise a single inversion device. In some such embodiments, the inversion device is a static mixer designed and adapted to provide a pressure drop of about 2 psi to 150 psi between the inlet and outlet of the static mixer. It will be understood by one of skill that the parameters of diameter, length, mixing element number and configuration is designed and adapted to provide the targeted pressure drop when contacted with a water source and a water-in-oil latex at a selected flow rate. Suitable static mixers for use in the inversion systems include those sold by Sulzer Ltd. of Winterthur, Switzerland under the trade names SMX and SMV and described in document EP 1437173, which is incorporated by reference herein in its entirety. Other static mixers suitably employed in the inversion systems include those sold by Koflo Corporation of Cary, Ill. Useful static mixers employed in the inversion systems of the invention comprise at least about 5 static mixer elements, for example about 5 to 100 static mixer elements, for example about 5 to 90, or about 5 to 80, or about 5 to 70, or about 5 to 60, or about 10 to 50, or about 5 to 40, or about 5 to 30, or about 5 to 20, or about 5 to 10, or about 10 to 100, or about 10 to 50, or about 10 to 40, or about 10 to 30, or about 10 to 20, or about 15 to 50, or about 15 to 40, or about 15 to 30, or about 20 to 50 mixing elements.

In some embodiments, the inversion systems of the invention comprise a single inversion device. In some such embodiments, the inversion device is a mixing pump designed and adapted to provide a pressure drop of about 2 psi to 150 psi between the inlet and outlet of the pump. Pumping devices useful in conjunction with the present inversion systems include centrifugal pumps and positive displacement pumps. Such mixing pumps are designed to provide low shear to the materials applied thereto.

In some embodiments, the inversion systems of the invention comprise a single inversion device. In some embodiments, the inversion device is characterized by the absence of mixing elements. Inversion devices characterized by the absence of mixing elements are usefully designed and adapted to provide a pressure drop of about 2 psi to 150 psi between the inlet for the water source and the outlet where the dilute latex exits the device. FIGS. 1-7 show exemplary inversion devices characterized by the absence of mixing elements; FIGS. 8-9 show exemplary inversion systems employing the devices of FIGS. 1-7.

As shown in FIGS. 1-7, an inversion device (12) employed in the inversion systems and in conjunction with the inversion methods of the present invention comprises four primary components: a first conduit (1); a second conduit (4); and a chamber (7). Optionally, the device includes an adaptor (8) useful for fluidly connecting the device to one or more pipes, tubes, and the like. The dimensions and geometries of each component of the inversion device are selected by one of skill depending upon the rate of flow of the water source and w/o latex that is fed into the inversion device, as well other factors, such as localized temperatures or the construction of the pipeline into which diluted w/o lattices are dispensed.

As shown in FIGS. 1-7, the first conduit (1) of device (12) has one or more inlets (2) and one or more outlets (3). In some embodiments, the conduit has both a head portion (10) and a cylindrical portion extending into a cylinder portion (11). In some embodiments, cylinder portion (11) is cylindrical in shape; in other embodiments cylinder portion (11) has a frustoconical shape. The second conduit (4) has one or more inlets (5) and outlets (6). The second conduit (4) secures to the first conduit's head portion (10) by any fastening means that would be appreciated by one of ordinary skill in the art, for example, the head portion (10) of the first conduit and the second conduit (4) may have one or more openings so that a screw can secure one conduit to another.

As shown in FIGS. 1-7, chamber (7) of device (12) has one or more inlets (17) and outlets (18) that are in communication with the outlets of both the first conduit (1) and the second conduit (4). In some embodiments, chamber (7) and second conduit (4) are formed from physically separate articles. In other embodiments, chamber (7) and second conduit (4) are geometrically distinct areas of a single article. In embodiments where chamber (7) and second conduit (4) are formed from physically separate articles, chamber (7) is secured to second conduit (4). The chamber (7) is secured to the second conduit (4) by any fastening means that would be appreciated by one of ordinary skill in the art. For example, both the second conduit (4) and the chamber (7) may have one or more openings so that a screw can secure the second conduit to the chamber, or the outer surface of the chamber (7) can fuse to the outer surface of the second conduit (4). The conduits inlets, outlets, and chamber of the inversion device are characterized by the absence of mixing elements.

As shown in FIGS. 1-7, adaptor (8) of device (12) secures to chamber (7) and is communication with the outlets of the chamber (7). The adaptor (8) may secure to the chamber (7) by any fastening means that would be appreciated by one of ordinary skill in the art, for example, a portion of the chamber (7) may insert into the adaptor (8).

Figure 6A:
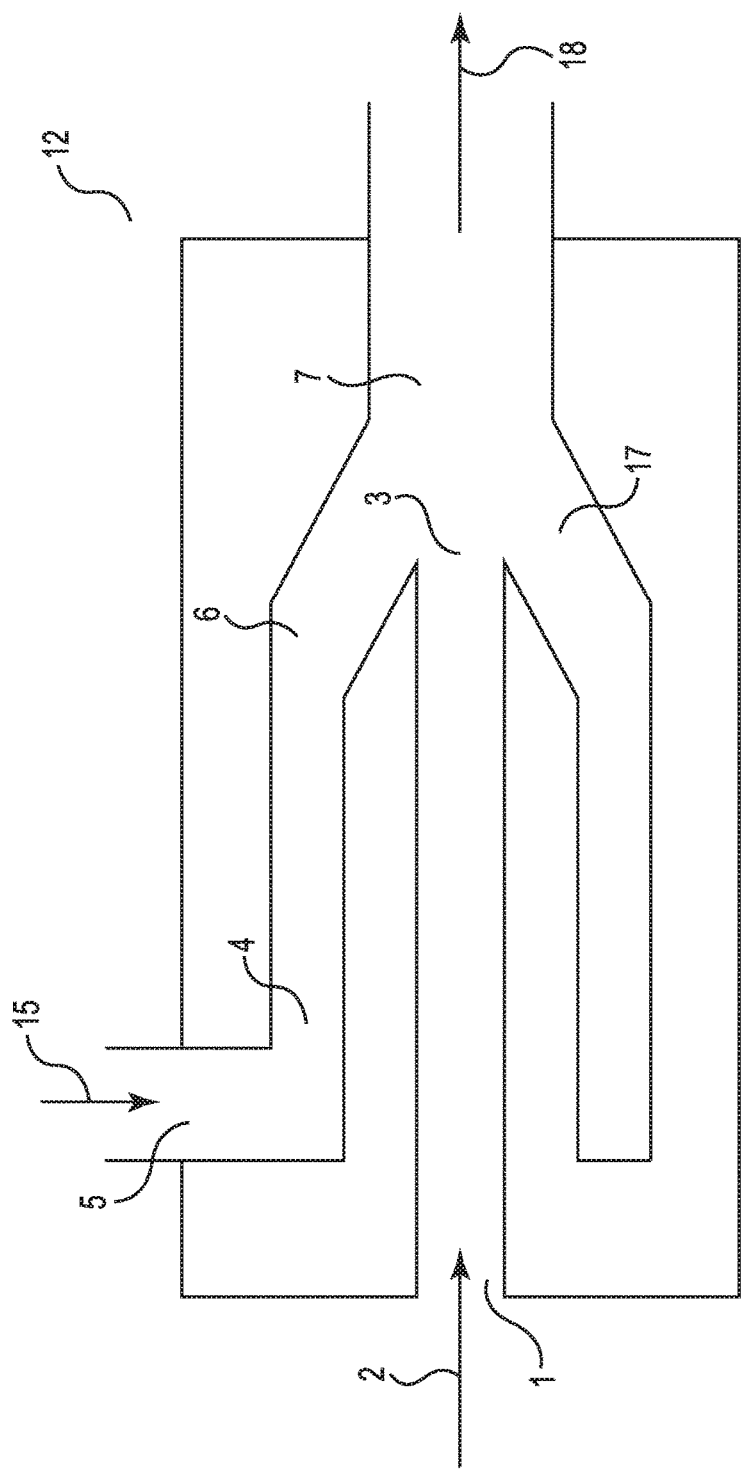
FIG. 6A is a schematic illustration of an inversion device.
Figure 6C:
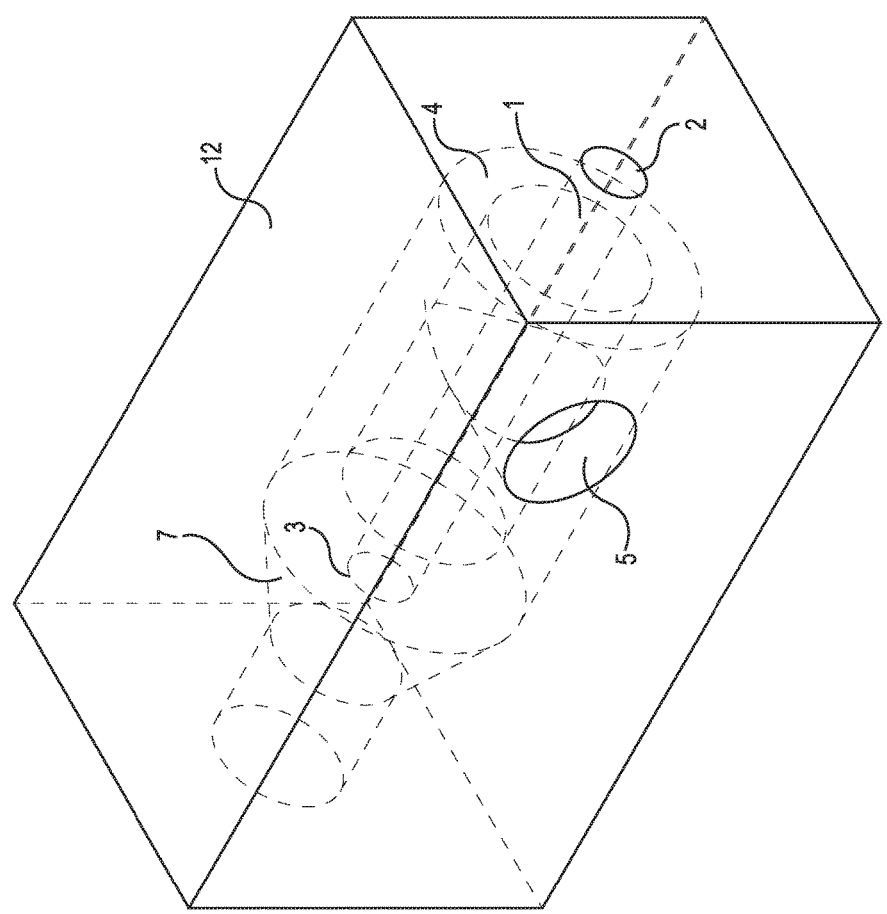
FIG. 6C is a three dimensional illustration of the inversion device of FIGS. 6A and 6B.

As shown in FIGS. 6A-6C, the inlets (5) of said second conduit (4) of device (12) are situated substantially perpendicular to said second conduit (4). Further as shown in FIGS. 6A-6C, inlets (5) of said second conduit (4) are perpendicular to first conduit (1). As shown in FIGS. 6A and 6C, at least a portion of chamber (7) comprises a frustoconical shape. As shown in FIG. 6B, the second conduit (4) is perpendicular to, but offset from first conduit (1). As shown in FIGS. 6B and 6C, the axial center lines of first conduit (1) and an inlet (5) are perpendicular to each other but do not intersect. In such embodiments, the offset of first conduit (1) causes a flow pattern within the device wherein the center line of flow incoming through inlet (5) does not intersect with the center line of flow incoming through inlet (2).

Figure 7:
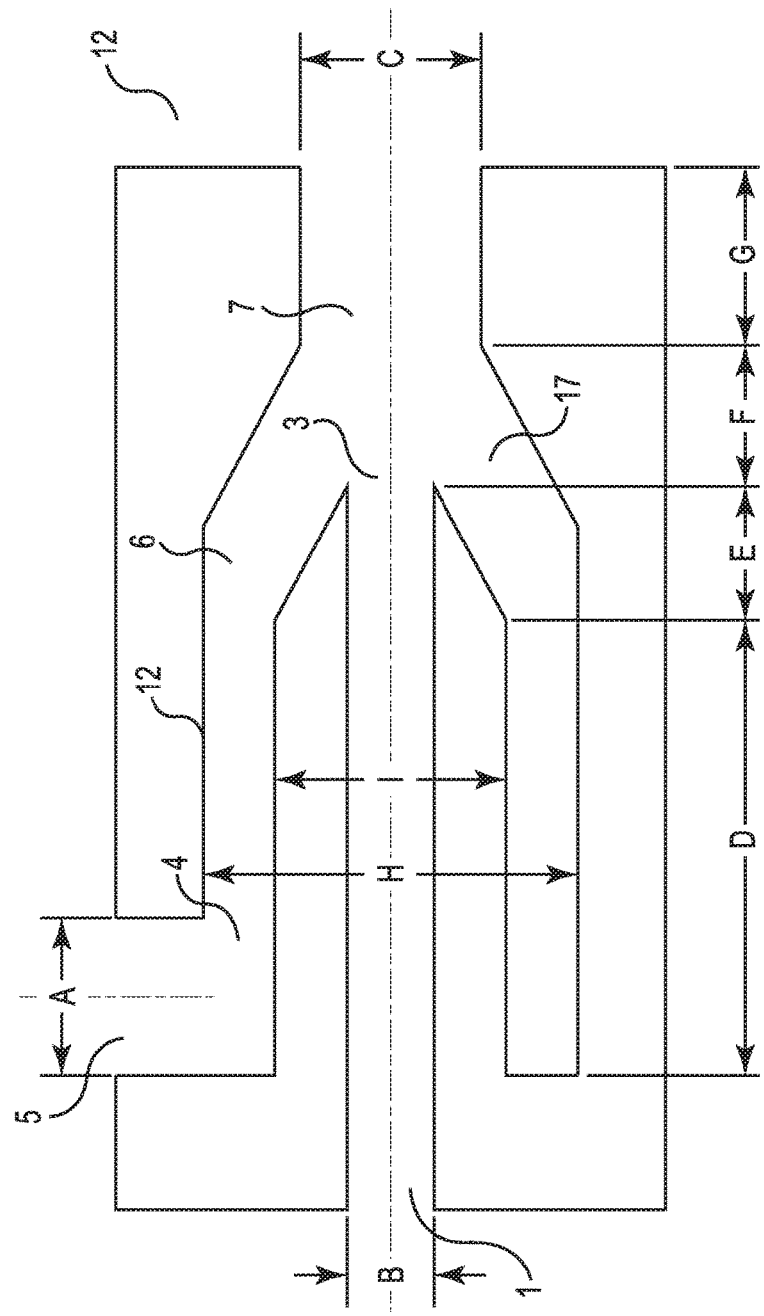
FIG. 7 is a schematic illustration of an inversion device.
Figure 8:
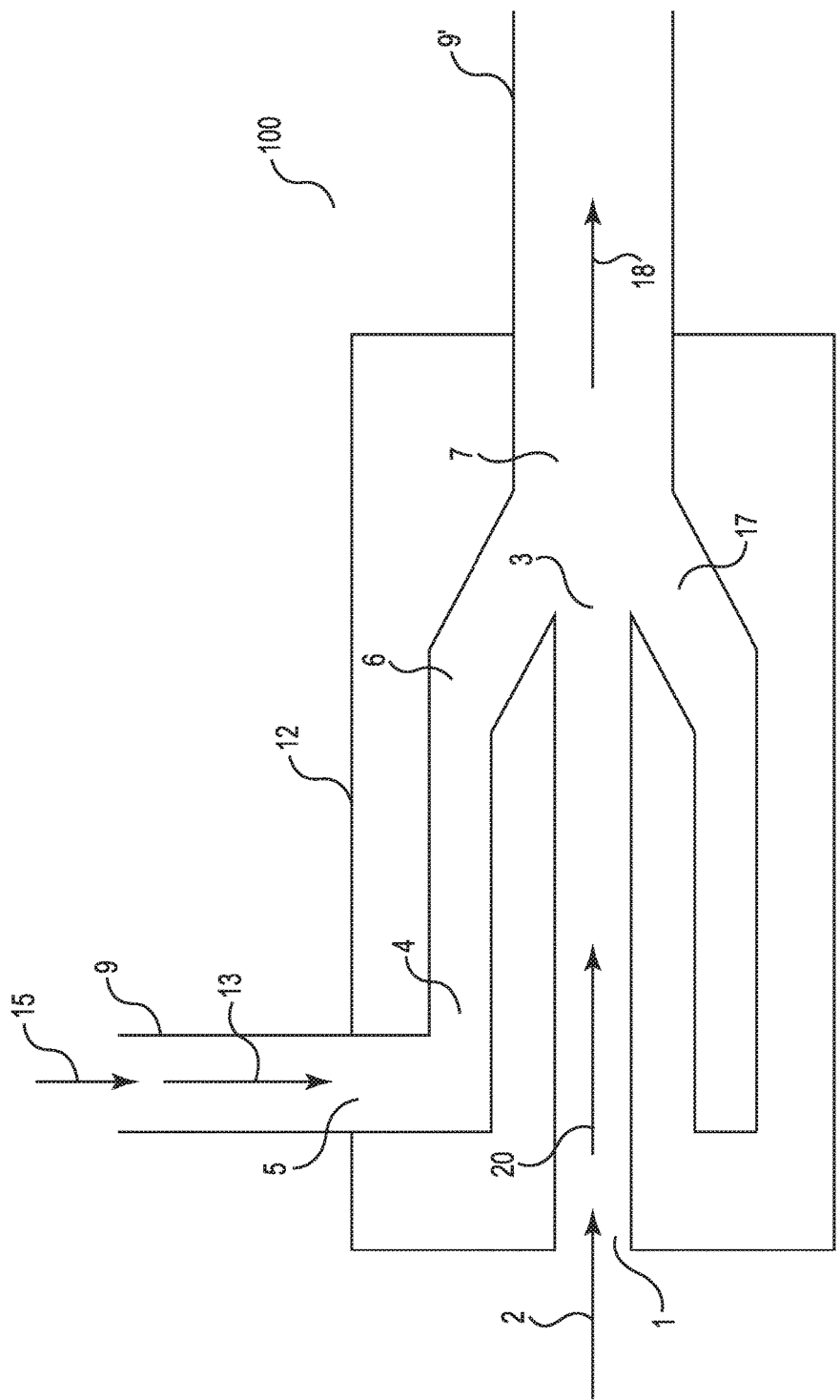
FIG. 8 is a schematic illustration of a system for inverting a latex according to an embodiment of the present invention.

In the embodiment of device (12) shown in FIG. 7, conduit (1) is coaxial with chamber (7) and outlet (18). In other embodiments, the center axis of flow through conduit (1) is offset from the center axis of flow through chamber (7) and outlet (18).

In some embodiments of device (12) as shown in FIGS. 1-7, the first conduit (1) has a head portion (10) that does not traverse said second conduit (4) and a portion that traverses said second conduit (4). During use of the device (12), first conduit (1) is in fluid communication with chamber (7). Outlets (3) of said first conduit (1) are proximal to inlet (17) of chamber (7). In some such embodiments, outlets (3) of said first conduit (1) are contiguous to inlet (17) of chamber (7). In other such embodiments, outlets (3) of said first conduit (1) or lie within inlet (17) of chamber (7). In still other such embodiments, outlets (3) of said first conduit (1) or lie within chamber (7).

In some exemplary embodiments, the inversion device characterized by the absence of mixing elements provides reduced shear on the latex being diluted within the device when compared to conventional dynamic or even static mixers. Since the polymers employed in EOR applications are desirably very high molecular weight materials, such as $1 \times 10^6$ to $1 \times 10^8$ g/mol, they are susceptible to shearing forces that can lead to substantial amounts of polymer chain scission. Substantial chain scission leads to a loss in observed viscosity of the resulting diluted polymer solution, forcing the user to employ higher concentrations of the latex feed in the dilution to achieve the targeted polymer solution viscosity. Thus it is highly advantageous to avoid shearing the polymers during dilution. By substantially reducing the shear force applied to the polymers during the dilution, as compared to use of conventional static and dynamic mixers, the inversion devices achieve greater efficiency during inversion: that is, a selected polymer solution concentration achieves a greater viscosity when subjected to less shear.

The inversion devices of the present invention are formed from materials suitable for handling materials used in EOR applications, including those carried out using high temperature and/or high total dissolved solids water sources, water soluble polymers, polymer solutions, polymer concentrates, w/o lattices, and chemicals such as scale inhibitors, biocides, foam inhibitors, surfactants, and the like that are known to those of skill in EOR operations. Suitable materials include those recognized by one of skill as useful to manufacture the inversion devices or various components thereof, further wherein the materials possessing physical characteristics suitable for exposure to the materials, pressures, and temperatures selected by the user. Examples of such materials include stainless steel, high nickel steel alloys, ceramics, thermoplastic or thermoset polymers, or polymer composites including particles, fibers, woven or nonwoven fabrics, and the like.

The inversion devices are designed and adapted to provide a pressure differential (or pressure drop) of about 2 psi to 150 psi between at least one inlet of the inversion device, and the outlet where the dilute latex exits the inversion device. Thus, for example, the minimum pressure differential is about 2 psi to 150 psi, or about 2 psi to 125 psi, or about 2 psi to 100 psi, or about 2 psi to 75 psi, or about 2 psi to 50 psi, or about 2 psi to 40 psi, or about 2 psi to 30 psi, or about 2 psi to 20 psi, or about 2 psi to 15 psi, or about 5 psi to 150 psi, or about 10 psi to 150 psi, or about 5 psi to 100 psi, or about 5 psi to 50 psi, or about 5 psi to 30 psi, or about 5 psi to 20 psi, or about 10 psi to 100 psi, or about 10 psi to 50 psi, or about 10 psi to 30 psi between the inlets and outlets of the inversion device, that is, between the points of entry of materials and exit of the dilute latex from the inversion device. The pressure within the inversion device is limited in some embodiments solely to avoid the mechanical degradation of the polymers present within the devices during inversion. However, it is a feature of the methods and devices of the invention that low pressure drop, for example as low as 2 psi pressure differential, is sufficient to provide rapid and complete inversion of lattices including 10 wt % to 80 wt % polymer to result in polymer solutions including 1 wt % or less polymer.

In some embodiments, the inversion devices are designed and adapted to invert w/o lattices comprising about 10 wt % to 80 wt % of one or more water soluble polymers having a weight-average molecular weight of about 1,000,000 to 100,000,000 g/mole to result in polymer solutions having less than about 20% loss of polymer average molecular weight based on the starting latex, by employing a single step inversion using the inversion devices of the invention. In embodiments, the weight average molecular weight of the water soluble polymer is about 1,000,000 g/mol to 100,000,000 g/mol, or about 2,000,000 to 100,000,000 g/mole, or about 3,000,000 to 100,000,000 g/mole, or about 5,000,000 to 100,000,000 g/mole, or about 7,000,000 to 100,000,000 g/mole, or about 1,000,000 to 80,000,000 g/mole, or about 1,000,000 to 60,000,000 g/mole, or about 5,000,000 to 90,000,000 g/mole, or about 5,000,000 to 80,000,000 g/mole, or about 5,000,000 to 70,000,000 g/mole, or about 5,000,000 to 60,000,000 g/mole, or about 5,000,000 to 50,000,000 g/mole, or about 5,000,000 to 40,000,000 g/mole or about 5,000,000 to 30,000,000 g/mole, or about 5,000,000 to 20,000,000 g/mole, or about 5,000,000 to 15,000,000 g/mole, or about 5,000,000 to 10,000,000 g/mole. In some embodiments, the loss of polymer average molecular weight of the polymer solution based on the polymer average molecular weight of the starting latex is 0% to about 20%, or about 2% to 20%, or about 4% to 20%, or about 6% to 20%, or about 8% to 20%, or about 10% to 20%, or 0% to about 18%, or 0 to about 16%, or 0 to about 14%, or 0 to about 12%, or 0 to about 10%, or about 5% to 15%, or about 5% to 10% loss of polymer average molecular weight based on the starting latex.

In some embodiments, the inversion devices are designed and adapted to invert w/o lattices comprising about 10 wt % to 80 wt % of one or more water soluble polymers having a weight-average molecular weight of about 1,000,000 to 100,000,000 g/mole to result in polymer solutions having less than about 20% loss of polymer average solution viscosity based on the theoretical polymer solution viscosity (that is, the expected solution viscosity for the polymer when fully inverted and hydrated in the absence of substantial shear), for example 0% to about 20%, or about 2% to 20%, or about 4% to 20%, or about 6% to 20%, or about 8% to 20%, or about 10% to 20%, or 0% to about 18%, or 0 to about 16%, or 0 to about 14%, or 0 to about 12%, or 0 to about 10%, or about 5% to 15%, or about 5% to 10% loss of polymer average solution viscosity based on the theoretical polymer solution viscosity.

The inversion devices are further characterized in that their use within the inversion systems of the invention results in inversion time of about 5 minutes or less, for example about 1 to 5 minutes, or about 2 to 5 minutes, or about 3 to 5 minutes, or about 4 to 5 minutes, or about 1 to 4 minutes, or about 1 to 3 minutes, or about 1 to 2 minutes. The inversion time is defined as the time between contact of the water source with the w/o latex, and formation of a dilute latex—that is, where the water source and the latex are fully mixed. In some embodiments, the inversion time is the residence time of the mixing components within the inversion device of the invention; that is, a water source and a w/o latex are applied to the inversion device and a dilute latex exits the device. In other embodiments, the dilute latex forms after exiting the inversion device.

The inversion devices are characterized in that their use within the inversion systems of the invention results in formation of dilute lattices in a single step. The dilute lattices are formed in 5 minutes or less. The dilute lattices are polymer solutions, or subsequently become polymer solutions within about 180 minutes of formation of the dilute latex and without carrying out any further mixing operations other than the mixing that occurs during transport in a pipe, for example an injection pipe.

The polymer solutions are characterized by the lack of observable coagulation, precipitation, or gross phase separation of the polymer from the water source. The polymer solutions are further characterized by a Filter Ratio (FR) of 1.5 or less when measured using industry standard methods of filtration of a polymer solution or dilute latex having 1000 ppm polymer through a filter having a 5 µm pore size, for example about 1.0 to 1.5, 1.0 to 1.4, or about 1.0 to 1.3, or about 1.0 to 1.2, or about 1.0 to 1.1, or about 1.0 when measured using industry standard methods of filtration of a polymer solution or dilute latex having 1000 ppm polymer through a filter having a 5 µm pore size.

In embodiments where the inversion device is characterized by the absence of mixing elements, further as shown in FIGS. 1-7, the length of the first conduit of the inversion device is adjusted to minimize the inversion time. The spacing between introduction of the latex and the water source within the inversion device is suitably adjusted by adjusting the relative lengths of the first and second conduits. Optimal spacing is achieved depending on the rate of feed of the water source and the latex, overall dimensions of the system and overall dimensions of the inversion device relative to the rate of flow. In some embodiments, the first conduit includes a single outlet. In some such embodiments, the single outlet is positioned to direct the latex flow in a substantially linear fashion through the first conduit and through the outlet of the first conduit. In some such embodiments, the first conduit provides for injection of the latex directly into the chamber inlets of the inversion device or even directly into the chamber.

The relative sizes of the various features of the inversion devices characterized by the absence of mixing elements—such as conduit lengths, conduit inner diameters, inlet and outlet sizes, and the like—are adjusted to provide proper flow and pressure drop within the device. An exemplary inversion device is shown in FIG. 7, which is similar to the device of FIG. 6A wherein letter labels A to I correspond to the following exemplary, non-limiting measurements and flow rates useful in diluting a latex having about 10 wt % to 80 wt % polymer content to form a dilute latex having 10,000 ppm (1 wt %) polymer content, further accounting for rates of water source flow commonly encountered by those practicing the art of tertiary oil recovery by diluting a w/o latex with a water source.

| Device 1 | | | | | | | | | |
|---|---|---|---|---|---|---|---|---|---|
| drive H$_2$O in | A | 20 | mm | 314 | mm$^2$ | flow min | 3.40 m$^3$/h | flow max | 17.00 m$^3$/h |
| polymer | B | 10 | mm | 79 | mm$^2$ | flow min | 0.11 m$^3$/h | flow max | 0.57 m$^3$/h |
| mixture out | C | 20 | mm | 314 | mm$^2$ | | | | |
| | D | 50 | mm | | | | | | |
| | E | 15 | mm | | | | | | |
| | F | 15 | mm | | | | | | |
| | G | 20 | mm | | | | | | |
| | H | 40 | mm | | | | | | |
| | I | 25 | mm | | | | | | |

| Device 2 | | | | | | | | | |
|---|---|---|---|---|---|---|---|---|---|
| drive H$_2$O in | A | 63 | mm | 3140 | mm$^2$ | flow min | 34.00 m$^3$/h | flow max | 170.00 m$^3$/h |
| polymer | B | 32 | mm | 790 | mm$^2$ | flow max | 0.10 m$^3$/h | flow max | 5.70 m$^3$/h |
| mixture out | C | 63 | mm | 3140 | mm$^2$ | | | | |
| | D | 150 | mm | | | | | | |
| | E | 50 | mm | | | | | | |
| | F | 45 | mm | | | | | | |
| | G | 60 | mm | | | | | | |
| | H | 120 | mm | | | | | | |
| | I | 75 | mm | | | | | | |

| Device 3 | | | | | | | | | |
|---|---|---|---|---|---|---|---|---|---|
| drive H$_2$O in | A | 100 | mm | 7854 | mm$^2$ | flow min | 85.00 m$^3$/h | flow max | 425.00 m$^3$/h |
| polymer | B | 50 | mm | 1964 | mm$^2$ | flow max | 2.75 m$^3$/h | flow max | 14.25 m$^3$/h |
| mixture out | C | 100 | mm | 7854 | mm$^2$ | | | | |
| | D | 250 | mm | | | | | | |
| | E | 75 | mm | | | | | | |
| | F | 75 | mm | | | | | | |
| | G | 100 | mm | | | | | | |
| | H | 200 | mm | | | | | | |
| | I | 125 | mm | | | | | | |

All parameters and flow rates listed for Devices 1-3 are approximate can vary ±20% for each parameter or flow rate depending on the selection by one of skill. The recited parameters are scalable at scale factors of about 0.25 to 10, or 1 to 5. In some embodiments, the flow rate of the water source is about 3 m³/hr to 5000 m³/hr, for example about 10 m³/hr to 5000 m³/hr, or about 50 m³/hr to 5000 m³/hr, or about 100 m³/hr to 5000 m³/hr, or about 250 m³/hr to 5000 m³/hr, or about 500 m³/hr to 5000 m³/hr, or about 750 m³/hr to 5000 m³/hr, or about 1000 m³/hr to 5000 m³/hr, or about 2000 m³/hr to 5000 m³/hr, or about 2500 m³/hr to 5000 m³/hr, or about 3 m³/hr to 4000 m³/hr, or about 3 m³/hr to 3000 m³/hr, or about 3 m³/hr to 2500 m³/hr, or about 3 m³/hr to 2000 m³/hr, or about 3 m³/hr to 1500 m³/hr, or about 3 m³/hr to 1000 m³/hr, or about 3 m³/hr to 750 m³/hr, or about 3 m³/hr to 500 m³/hr, or about 3 m³/hr to 250 m³/hr, or about 3 m³/hr to 100 m³/hr, or about 100 m³/hr to 4000 m³/hr, or about 500 m³/hr to 4000 m³/hr, or about 500 m³/hr to 4000 m³/hr, or about 500 m³/hr to 3000 m³/hr.

In some embodiments, the flow rate of the latex source is about 0.1 m³/hr to 500 m³/hr, or about 0.5 m³/hr to 500 m³/hr, or about 1 m³/hr to 500 m³/hr, or about 3 m³/hr to 500 m³/hr, or about 5 m³/hr to 500 m³/hr, or about 7 m³/hr to 500 m³/hr, or about 10 m³/hr to 500 m³/hr, or about 25 m³/hr to 500 m³/hr, or about 50 m³/hr to 500 m³/hr, or about 75 m³/hr to 500 m³/hr, or about 100 m³/hr to 500 m³/hr, or about 0.5 m³/hr to 450 m³/hr, or about 0.5 m³/hr to 400 m³/hr, or about 0.5 m³/hr to 350 m³/hr, or about 0.5 m³/hr to 300 m³/hr, or about 0.5 m³/hr to 250 m³/hr, or about 0.5 m³/hr to 200 m³/hr, or about 0.5 m³/hr to 150 m³/hr, or about 0.5 m³/hr to 100 m³/hr, or about 5 m³/hr to 400 m³/hr, or about 5 m³/hr to 300 m³/hr, or about 10 m³/hr to 400 m³/hr, or about 10 m³/hr to 300 m³/hr, or about 10 m³/hr to 200 m³/hr or about 50 m³/hr to 400 m³/hr, or about 50 m³/hr to 300 m³/hr, or about 50 m³/hr to 200 m³/hr. The parameters and flow rates shown above for Devices 1-3 are suitable for diluting a latex having about 20 wt % to 80 wt % polymer content to form a dilute latex having 10,000 ppm (1 wt %) polymer content in 5 minutes or less.

The inversion devices are characterized in that their use within the inversion systems of the invention results in formation of dilute lattices in a single step. The dilute lattices are formed in 5 minutes or less. The dilute lattices are polymer solutions, or subsequently become polymer solutions within about 180 minutes of formation of the dilute latex without carrying out any further mixing operations. The polymer solutions are characterized by the lack of observable coagulation, precipitation, or gross phase separation of the polymer from the water source. The polymer solutions are further characterized by a Filter Ratio (FR) of about 1.5 or less when measured using industry standard methods of filtration of a polymer solution or dilute latex having 1000 ppm polymer through a filter having a 5 µm pore size.

Inversion Systems

The inversion systems of the invention comprise at least one inversion device as described above. In some embodiments, the inversion system is characterized as having a single inversion device and no additional mixing devices. In other embodiments, the inversion system further comprises one or more mixing devices situated downstream from the inversion device, wherein the one or more mixing devices are selected from static mixers and pumps. In all such embodiments, the inversion device is situated in fluid communication with a water source. In some embodiments, the inversion device is disposed in-line with a water source such that the entire flow of the water source passes through the inversion device. In all such embodiments, the inversion device is situated in fluid communication with a latex source.

In embodiments, the inversion systems of the invention include an inversion device, a latex source fluidly connected to the first conduit of the inversion device, a water source fluidly connected to the second conduit of the inversion device, and a pipeline connected to the outlet of the inversion device and situated to receive a dilute latex and/or a polymer solution for use in one or more EOR applications.

Surprisingly, we have found that the inversion devices are advantageously used in one or more methods of the invention to dilute, or "make down" conventional w/o lattices for EOR in a single dilution step. No additional mixing or diluting is required. In conventional dilution methods, the tradeoff of high shear mixing, leading to loss of viscosity, for loss of mixing efficiency is well understood by those of skill. However, by employing inversion devices characterized as providing low shear, such as static mixers or mixing pumps, or by employing devices characterized by the absence of mixing elements, we have realized sufficiently high mixing efficiency to achieve dilution of conventional w/o lattices in a single dilution step to reach a polymer concentration of about 10,000 ppm or less. The molecular weight of the diluted polymer is reduced by 20% or less, compared to the expected molecular weight of the polymer in the absence of shear. The viscosity of the polymer solution is reduced by 20% or less, as a relative measure of molecular weight after inversion compared to the expected viscosity of a polymer solution of the same concentration of polymer formed in the absence of shear. The dilution takes about 5 minutes or less. Optionally, after dilution, a dilute latex is subjected to one or more pumping or static mixing steps to accelerate formation of the polymer solution.

The inversion devices and systems of the invention provide a method of diluting one or more w/o lattices into a process stream, the process stream comprising a water source. As shown in FIGS. 8-9, an inversion system (100) includes inversion device (12), adaptor (8), alone or as part of an apparatus for feeding, attached to an opening (16) in a pipeline (9) wherein the adaptor (8) is secured to the pipeline (9) by any means that would be appreciated by one of ordinary skill in the art. After this setup is established, one or more w/o lattices and a water source are introduced into the inversion device (12), mixed in the chamber (7), and fed into the pipeline (9). In some embodiments the water source is diverted from the pipeline (9) at a point upstream from adaptor (8). In some embodiments, pipeline (9) contents comprise, consist essentially of, or consist of produced water or sea water resulting from one or more subterranean hydrocarbon recovery processes.

Those of ordinary skill in the art will recognize many vehicles suitable for introducing w/o latex sources and water sources into the inversion device; such vehicles include tanks, pressure sources, pumps, valves, regulators, pipes, measuring devices, and computerized process measurement and control means. Such conventional chemical metering and fluid control equipment is suitably optimized for use in the inversion systems of the invention.

In some embodiments, the inversion systems of the invention further include one or more mixing devices situated downstream in the flow toward the subterranean reservoir from the inversion device. For example, in some embodiments, the mixing device is a static mixer, a pump, or a combination of two or more of either of these. In an advantageous embodiment, the inversion device is a static mixers similar to or such as those sold by Sulzer Ltd. of Winterthur, Switzerland under the trade names SMX and SMV and described in document EP 1437173, incorporated by reference in its entirety herein. Other static mixers suitably employed in the inversion systems include those sold by Koflo Corporation of Cary, Ill. Preferably, the static mixers contain at least 10 mixing elements, for example about Useful static mixers employed in the inversion systems of the invention comprise at least about 5 static mixer elements; for example about 5 to 100 static mixer elements, for example about 5 to 90, or about 5 to 80, or about 5 to 70, or about 5 to 60, or about 5 to 50, or about 5 to 40, or about 5 to 30, or about 5 to 20, or about 7 to 100, or about 10 to 100, or about 12 to 100, or about 14 to 100, or about 16 to 100, or about 18 to 100, or about 20 to 100, or about 22 to 100, or about 24 to 100, or about 26 to 100, or about 28 to 100, or about 10 to 50 static mixer elements.

In some embodiments, the inversion systems of the invention further include one or more pumping devices situated downstream in the flow toward the subterranean reservoir from the inversion device. Pumping devices useful in conjunction with the present inversion systems include centrifugal pumps and positive displacement pumps.

One of skill will appreciate that the dimensions of the one or more inversion devices are suitably optimized to provide a rate of throughput and a pressure differential according to the previously discussed parameters by applying conventional engineering principles.

Optionally, in some embodiments a first inversion device is situated in line with a bypass flow and a second inversion device is situated in line with the main water source flow. Optionally, a first and second inversion device are situated in line with the main water source flow.

In an exemplary embodiment, FIG. 8 shows inversion system (100) including inversion device (12), characterized by the absence of mixing elements and disposed in-line with one or more water sources (13) flowing through a pipeline (9) toward one or more subterranean reservoirs. Water source (13) is introduced into inversion device (12) via inlet (15). A latex source (20) is introduced into inlet (2) of conduit (1). The water source (13) and latex source (20) are mixed in chamber (7) to form a dilute latex, which is dispensed via outlet (18) into pipeline (9'). The dilute latex forms a polymer solution between chamber (7) and the subterranean reservoir, about 0.1 second to 150 minutes after entering chamber (7).

In another exemplary embodiment, FIG. 9 shows another inversion system (101) wherein bypass flow (15) is taken from water source (13) flowing through pipeline (9) at a point (9') upstream from inversion device (12). Bypass flow (15) is introduced into conduit (4) via inlet (5). A latex source (20) is introduced via pipeline (19) into inlet (2) of conduit (1). Water source (13) and latex source (20) are mixed in chamber (7) to form a dilute latex, which is dispensed via outlet (18) into pipeline (9'). The dilute latex combines with water source (13) to form combined flow (13'). Combined flow (13') forms a polymer solution between outlet (18) and the subterranean reservoir, about 0.1 second to 150 minutes after entering chamber (7). In such embodiments, the dilution of the w/o latex is partially carried out within the inversion device, such that the polymer solids content of the dilute latex is about 1 wt % or less; additional dilution is then completed as the bypass flow joins the main water source flow.

In either of the embodiments shown in FIGS. 8-9, it is a feature of the invention that inversion systems of the invention comprise a single inversion device. Only one inversion device is required in the inversion systems of the invention in order to transform a w/o latex to a dilute latex that becomes a polymer solution without further mixing or dilution steps. However, optionally one or more static mixers, pumps, or both are employed in-line and downstream from the inversion device. Such mixers and pumps include mixing elements and are employed to facilitate improved mixing of the dilute latex or polymer solution components. However, no additional dilution is carried out after formation of the dilute latex; that is, two or more separate additions of a water source to the w/o lattices or dilute lattices are not required when employing the inversion systems of the invention.

As shown in FIGS. 8-9, the co-feeding of different liquid compositions into a process stream (13) can be achieved by the following steps: introducing several different compositions into the inversion device (12), allowing a mixture of the different compositions to form, and dispensing the mixture into a process stream (13). Compositions including the w/o lattices are added to the system in any order prescribed by a person of ordinary skill in the art. For example, the w/o lattices, the water source, and one or more additives suitably added to a latex, dilute latex, or polymer solution, such as stabilizers, surfactants, and the like maybe added sequentially, simultaneously or in pre-programmed order and blended in a single step.

In some embodiments the activity of the sources fed into inversion device (12) is controlled by adjusting the flow rate of the sources introduced into the device, adjusting the internal dimensions of the inversion device (12), or both. One or more pumps that are in communication with the inversion device may be suitably employed to adjust the flow rates. Staged mixing can be achieved in chamber (7) by controlling flow rates of sources fed into the chamber. In yet another embodiment, the rate of mixing of the latex and the water source prior to their introduction into said process stream is controlled by adjusting the flow rate of said latex and water source, which are introduced into the mixing chamber.

The inversion systems of the invention include various additional elements and devices, without limitation, to regulate, support, and augment mixing of the water source with a w/o latex. These additional devices include, for example, tanks, sensors, flow regulators, pressure gauges, injection ports, sampling ports, and the like; they are connected within the inversion system via pipes, valves, wires, connectors, and the like commonly employed in the industry, as will be appreciated by one of skill. The one or more additional elements and devices do not substantially modify the ability of the inversion device to accomplish the mixing necessary to form a polymer solution, but instead are positioned within the inversion system to provide or regulate or measure one or more materials or values such as water source flow rate, temperature, the rate of addition of the w/o latex to the inversion device, and the like.

Examples of suitable additional devices include a screen, such as a filter basket or a Y-strainer basket situated upstream from the inversion device; one or more quill type injectors incorporated within or disposed upstream from the inversion device for introducing fluids into the water source; and one or more additional devices or device elements used to provide further mixing, to develop a pressure drop, or both. Such additional devices include multiple orifice series or arrays, in-line diffusers, pipeline mixers, valves, nozzles, orifice plates, tee mixers, jet mixers, static plate mixers, inline vortex mixers, rotor stator mixers, and pipeline mechanical mixers.

Inversion Methods

One of skill will appreciate that the dimensions and particular arrangement of the inversion device in the inversion system, and the rate of addition of the latex source to the inversion device are selected and optimized by one of skill based on conditions encountered in the individual subterranean reservoir, including water source flow rate and available infrastructure for the inversion system.

Described herein is a method of inverting a water-in-oil latex, the method comprising: (a) applying a water-in-oil latex source to an inversion device, the latex comprising about 10 wt % to 80 wt % of a water soluble polymer and about 2 wt % to 5 wt % of a surfactant having an HLB of 14 or greater, (c) applying a water source to the inversion device, (d) contacting the latex with the water source within the inversion device to form a dilute polymer latex; and (e) dispensing the dilute latex from the inversion device, the dilute polymer latex or polymer solution comprising about 10,000 ppm or less of the water soluble polymer.

The invertible lattices useful in conjunction with the present invention are characterized in some embodiments as a conventional water-in-oil (w/o) latex that further includes an inversion surfactant. Conventional w/o lattices are formed by dissolving monomer(s) including acrylamide in a high-solids aqueous solution to form a water phase, mixing a hydrocarbon solvent and a surfactant having an HLB of about 2 to 8 to form an oil phase, mixing the two phases using techniques that result in a water-in-oil emulsion or latex, and polymerizing the monomer via a free-radical azo or redox mechanisms to result in a water soluble polymer. After polymerization is complete, a higher HLB surfactant (HLB>8) is often added as a destabilizer to facilitate latex inversion when water is added. We have found that by employing about 2 wt % to 5 wt % of an inversion surfactant having an HLB of greater than 14, single step inversion using the devices and systems described herein is possible. Thus, "invertible lattices" described herein are defined as conventional w/o lattices comprising about 10 wt % to 80 wt % of a water soluble polymer and about 2 wt % to 5 wt % of a surfactant having an HLB of about 14 or greater.

Single step inversion of the invertible lattices is advantageously carried out using using any of the water sources available in the field for EOR applications. By "single step" it is meant that after an invertible latex and a water source are applied to an inversion device disposed within an inversion system of the invention to form a dilute latex, no subsequent addition of water sources or mixing force is required in order for the dilute latex to form a polymer solution. In some embodiments, additional mixing of the dilute latex occurs within the fluid flow in one or more pipes or tubes that are part of the inversion system of the invention; however, for the purposes of this disclosure such fluid flow is already present within the inversion system and thus is not added. It is an advantage of the methods of the invention that even high temperature water sources, high total dissolved water sources, and high temperature/high total dissolved water sources are easily applied to an inversion device together with an invertible latex to provide a single step inversion that results in a polymer solution having 10,000 ppm or less of polymer solids and a Filter Ratio (FR) of about 1.5 or less when measured using industry standard methods of filtration of a polymer solution or dilute latex having 1000 ppm polymer through a filter having a 5 µm pore size.

Inversion surfactants useful in the w/o lattices comprise, consist essentially of, or consist of surfactants or blends thereof having an HLB of about 14 to 30, or about 14 to 28, or about 14 to 26, or about 14 to 24, or about 14 to 22, or about 14 to 20, or about 14 to 18, or about 14 to 16, or about 15 to 30, or about 15 to 25, or about 15 to 20, or about 16 to 30, or about 16 to 25, or about 16 to 20, or about 17 to 30, or about 17 to 25, or about 17 to 20, or about 18 to 30, or about 19 to 30, or about 20 to 30. Examples of suitable inversion surfactants are listed in McCutcheon's Emulsifiers & Detergents, MC Publishing Co., 2014 edition. In some embodiments, the inversion surfactant is nonionic and includes one or more compounds comprising one or more ethoxy groups, propoxy groups, or a combination thereof. In some embodiments, the inversion surfactant is ionic and includes one or more carboxylate, sulfonate, phosphate, phosphonate, or ammonium moieties. In some embodiments, the inversion surfactant includes a linear or branched $C_8$-$C_{20}$ hydrocarbyl moiety. In some such embodiments, the inversion surfactant is an alkoxylated alcohol such as an ethoxylated, propoxylated, or ethoxylated/propoxylated alcohol, wherein the alcohol includes a linear or branched $C_8$-$C_{20}$ hydrocarbyl moiety. In some such embodiments, the inversion surfactant includes about 10 and 40 ethylene oxide repeat units and 0 to about 10 propylene oxide repeat units. In some embodiments, the inversion surfactant includes a sorbitan moiety. In some embodiments, the inversion surfactant is a block copolymer. In some such embodiments, the block copolymer is linear, branched, or hyperbranched.

In some embodiments, the water soluble polymer has a weight average molecular weight of about $1 \times 10^6$ to $1 \times 10^8$ g/mol and comprises repeat units derived from acrylamide. In some embodiments, the water soluble polymer comprises about 50 mol % acrylamide or more, for example about 60 mol % or more, or about 70 mol % or more, or about 80 mol % or more, or about 90 mol % or more; in an exemplary embodiment, the water soluble polymer is substantially a homopolymer of acrylamide. In another exemplary embodiment, the water soluble polymer comprises, consists essentially of, or consists of, a copolymer that is about 70 mol % acrylamide and about 30 mol % acrylic acid or a conjugate base thereof.

In some embodiments, the dispensing is about 5 minutes or less after the introducing. In some embodiments, the water source is a high temperature water source, a high total dissolved solids water source, or a high temperature/high total dissolved solids water source. In some embodiments, the methods further comprise mixing the dilute latex or a polymer solution after the dispensing, the mixing comprising static mixing or pumping.

The methods of the invention result in molecular weight reduction of the water soluble polymer of less than about 20% and viscosity reduction, compared to the expected viscosity of the polymer solution in the absence of shear, of less than about 20%.

The inversion device is employed in an inversion system of the invention to form a dilute latex from an invertible latex using the methods of the invention. The dilute latex forms a polymer solution after a hydration period. In embodiments, the hydration period is concurrent with and extends to a point in time after the dilution. The hydration period ends when the polymer achieves full hydrodynamic volume within the diluted aqueous environment. Thus, the end of the hydration period is manifested as maximum solution viscosity of the polymer in the dilute aqueous environment. In some such embodiments, the dilute latex becomes a polymer solution prior to the time it exits the inversion device. In other embodiments, the dilute latex flows from inversion device and subsequently forms a polymer solution. In such embodiments, the hydration period is about 0.1 seconds (s) to 180 minutes (min) after contact of the latex with the water source, or about 1 s to 180 min, or about 10 s to 180 min, or about 30 s to 180 min, or about 1 min to 180 min, or about 5 min to 180 min, or about 10 min to 180 min, or about 30 min to 180 min, or about 50 min to 180 min, or about 70 min to 180 min, or about 90 min to 180 min, or about 100 min to 180 min, or about 110 min to 180 min, or about 120 min to 180 min, or about 1 s to 160 min, or about 1 s to 140 min, or about 1 s to 120 min, or about 1 s to 100 min, or about 1 s to 180 min, or about 1 s to 60 min, or about 5 min to 120 min, or about 10 min to 120 min, or about 5 min to 100 min, or about 10 min to 120 min, or about 20 min to 120 min, or about 30 min to 120 min, or about 40 min to 120 min after contact of the latex with the water source.

Employing the inversion methods of the invention, an invertible latex is inverted to form a dilute latex that results in a polymer solution having less than about 10,000 ppm polymer solids based on the weight of the polymer solution, for example about 100 ppm to 10,000 ppm, or about 300 ppm to 10,000 ppm, or about 500 ppm to 10,000 ppm, or about 1000 ppm to 10,000 ppm, or about 2000 ppm to 10,000 ppm, or about 3000 ppm to 10,000 ppm, or about 4000 ppm to 10,000 ppm, or about 5000 ppm to 10,000 ppm, or about 100 ppm to 9000 ppm, or about 100 ppm to 8000 ppm, or about 100 ppm to 7000 ppm, or about 100 ppm to 6000 ppm, or about 100 ppm to 5000 ppm, or about 100 ppm to 4000 ppm, or about 100 ppm to 3000 ppm, or about 100 ppm to 2000 ppm, or about 100 ppm to 1000 ppm, or about 500 ppm to 7000 ppm, or about 300 ppm to 3000 ppm, or about 200 ppm to 2000 ppm, or about 200 ppm to 3000 ppm polymer solids based on the weight of the polymer solution. In some embodiments, the w/o latex is an invertible latex.

In embodiments, the time between the contact of the water source with the invertible latex and formation of a dilute latex is about 5 minutes (min) or less, for example about 5 seconds (s) to 5 min, or about 30 s to 5 min, or about 1 min to 5 min, or about 3 min to 5 min, or about 5 s to 4 min, or about 5 s to 3 min, or about 5 s to 2 min, or about 5 s to 1 min.

In some embodiments, the methods of the invention are useful to dilute invertible lattices comprising polymers having weight-average molecular weights of between about $1 \times 10^6$ g/mol and $1 \times 10^8$ g/mol and about 1 wt % to 5 wt % of a surfactant having an HLB of about 14 or greater, for example about 1.5 wt % to 5 wt %, or about 2 wt % to 5 wt %, or about 2.5 wt % to 5 wt %, or about 3 wt % to 5 wt %, or about 3.5 wt % to 5 wt %, or about 4 wt % to 5 wt %, or about 1 wt % to 4.5 wt %, or about 1 wt % to 4 wt %, or about 1 wt % to 3.5 wt %, or about 1 wt % to 3 wt %, or about 1 wt % to 2.5 wt %, or about 1 wt % to 2 wt %, or about 1.5 wt % to 4 wt %, or about 2 wt % to 4 wt % of a surfactant having an HLB of about 14 or greater to result in polymer solutions having less than about 20% loss of polymer average molecular weight based on the starting latex, for example 0% to about 20%, or about 2% to 20%, or about 4% to 20%, or about 6% to 20%, or about 8% to 20%, or about 10% to 20%, or 0% to about 18%, or 0 to about 16%, or 0 to about 14%, or 0 to about 12%, or 0 to about 10%, or 0 to about 5%, or about 5% to 15%, or about 5% to 10% loss of polymer average molecular weight based on the starting latex.

In some embodiments, the methods of the invention are useful to dilute w/o lattices comprising polymers having weight-average molecular weights of between about $1 \times 10^6$ g/mol and $1 \times 10^8$ g/mol and about 2.5 wt % to 5 wt % of a surfactant having an HLB of about 14 or greater, for example about 1.5 wt % to 5 wt %, or about 2 wt % to 5 wt %, or about 2.5 wt % to 5 wt %, or about 3 wt % to 5 wt %, or about 3.5 wt % to 5 wt %, or about 4 wt % to 5 wt %, or about 1 wt % to 4.5 wt %, or about 1 wt % to 4 wt %, or about 1 wt % to 3.5 wt %, or about 1 wt % to 3 wt %, or about 1 wt % to 2.5 wt %, or about 1 wt % to 2 wt %, or about 1.5 wt % to 4 wt %, or about 2 wt % to 4 wt % of a surfactant having an HLB of about 14 or greater to result in polymer solutions having less than about 20% loss of polymer average solution viscosity based on the predicted polymer solution viscosity, for example 0% to about 20%, or about 2% to 20%, or about 4% to 20%, or about 6% to 20%, or about 8% to 20%, or about 10% to 20%, or 0% to about 18%, or 0 to about 16%, or 0 to about 14%, or 0 to about 12%, or 0 to about 10%, or about 5% to 15%, or about 5% to 10% loss of polymer average solution viscosity based on the predicted polymer solution viscosity.

In some embodiments, the method comprises, consists essentially of, or consists of a single inversion (dilution) step employing an inversion system of the invention, wherein the inversion system includes a single inversion device. In some such embodiments, the invertible lattices employed in conjunction with the methods of the invention comprise about 10 wt % to 80 wt % of a water soluble polymer and about 2 wt % to 5 wt % of a surfactant having an HLB of about 14 or greater.

The polymer solutions formed using the systems and methods of the invention are characterized by the substantial absence of gel particulates, as determined by filtration quotient (or Filter Ratio) of the polymer solutions. The FR test used consists of measuring the time taken by given volumes of solution containing 1000 ppm polymer to flow through a filter. The solution is contained in an aluminum bell housing (Filter housing #142-59, obtained from OFI Testing Equipment Inc. of Houston, Tex.), pressurized to 20 psi and the filter has a diameter of 90 mm and a pore size of 5 microns. The filter composition is a Millipore hydrophilic mixed cellulose ester type, catalog number SMWP9025. The times required to obtain 90 ml (t90 ml); 120 ml (t120 ml) and 180 ml (t180 ml) and 210 ml (t210 ml) of filtrate are therefore measured and FR is expressed as:

$$FR = \frac{t210 \text{ ml} - t180 \text{ ml}}{t120 \text{ ml} - t90 \text{ ml}}$$

The FR thus represents the capacity of the polymer solution to plug the filter for two equivalent consecutive volumes. A typical acceptability criterion of the industry is FR<1.5.

In some embodiments, a hydration period within an the injection line after formation of the dilute latex provides sufficient time to allow the dilute latex to form a polymer solution that achieves adequate injectivity, as defined by a FR of about 1.5 or less, before the polymer reaches the reservoir rock. In embodiments, the hydration period is about 180 minutes or less, for example about 0.1 second to 180 minutes, or about 10 to 180 minutes, or about 20 to 180 minutes, or about 30 to 180 minutes, or about 40 to 180 minutes, or about 50 to 180 minutes, or about 5 to 140 minutes, or about 5 to 130 minutes, or about 5 to 120 minutes, or about 5 to 110 minutes, or about 5 to 100 minutes, or about 5 to 90 minutes, or about 5 to 80 minutes, or about 5 to 70 minutes, or about 5 to 60 minutes, or about 30 to 120 minutes, or about 40 to 100 minutes, or about 50 to 80 minutes.

In some embodiments, the flow rate of the liquid within the inversion systems of the invention are between 3 m³/h and 5000 m³/h and the injection pressure is between 40 and 200 bars. Injection pressure is governed by the field pressure. Similarly, the latex flow rate into the inversion device is between 0.1 m³/h and 500 m³/h, according to the type of borehole (vertical, horizontal, multiple, etc).

EXPERIMENTAL

Examples 1-4

A one-stage offshore inversion process was simulated using synthetic produced water at 60° C. The water contained 26,200 ppm (2.6 wt %) total dissolved solids with a hardness equivalent to 3700 ppm of CaCO₃. An inversion device having the dimensions shown in FIG. 9 was connected to a latex tank and the brine tank. The latex tank was connected to the inner conduit, or the first conduit as represented in FIGS. 1-7. The brine tank was connected to the outer conduit, or the second conduit as represented in FIGS. 1-7. The tanks were provided with metering equipment to adjust the flow rates of materials into the inversion device. At about 30 cm in length, the inversion device was less than half the length of conventionally employed static mixers, offering a significant advantage in terms of space requirements on off-shore platforms.

The invertible latex employed in the inversion was a conventional 30 mole % anionic inverse emulsion copolymer of sodium acrylate and acrylamide. It also contained 2.75 wt. % of an alkoxylated alcohol non-ionic surfactant having an HLB of about 14 to facilitate inversion.

The simulation was run four times as shown in Table 1 below. Examples 1, 2, and 3 were conducted with a brine flow rate of 41 gpm and Example 4 was conducted at 65 gpm. The latex was diluted to between 1000 ppm and 10,000 ppm with a final target polymer solution concentration in each case of 1000 ppm. In Examples 1 and 4, the latex polymer flow rate was adjusted to directly yield a dilute latex concentration of 1000 ppm. Examples 2 and 3 employed a higher latex flow rate to yield dilute latex concentrations of 5,000 and 10,000 ppm respectively to take advantage of the concentration effect and simulate injection of latex into a side-stream of the flood water. Samples of dilute latex collected from Examples 2 and 3 were allowed to sit idle for five minutes to represent the residence time in a side-stream pipe before re-joining the main flow of flood water. Aliquots of these samples were then further diluted manually 1 to 5 and 1 to 10 respectively with synthetic produced water at 60° C. to yield 1000 ppm polymer solutions.

The 1000 ppm polymer solutions were maintained at 60° C. for 20 minutes after the inversion before cooling to 23° C. During the cooling, the 1000 ppm solutions were stirred with a "Jiffy Mixer" cage stirrer to simulate the turbulence that would be experienced by the polymer solution in the pipe down to the formation in a particular application. Separate samples were stirred at two different speeds, 400 and 600 rpm, to simulate different flood water flow rates or different diameter piping with subsequently different turbulence.

The cooled polymer solutions were analyzed by the Filter Ratio (FR) test. Results of the test are shown in Table 1.

TABLE 1

Viscosity and FR results for inverted w/o latex of Examples 1-4.

| Parameter | Example No. | | | |
|---|---|---|---|---|
| | 1 | 2 | 3 | 4 |
| Polymer Conc. (ppm) | 1,000 | 5,000 | 10,000 | 1,000 |
| Water Flow Rate (gpm) | 41 | 41 | 41 | 65 |
| Pressure Drop (psi) | 22 | 22 | 17 | 76 |
| Average Viscosity (cP) | 6.4 | 4.2 | 4.0 | 4.6 |
| Filter Ratio (400 RPM) | Fail | 1.00 | 1.06 | 1.23 |
| Filter Ratio (600 RPM) | 1.07 | 1.00 | 1.00 | 0.99 |

Comparative Examples 1-3

The simulation in Examples 1 thru 4 was repeated but without an inversion device of FIGS. 1-7. In its place was substituted an injection quill made from 0.5 inch stainless steel tubing cut off square and bent 90 degrees into the produced water flow inside of a 2 inch pipe. Immediately after the quill was placed a Y-Strainer with ⅟₃₂th inch perforations to aid in dispersing the latex. Comparative Examples 1 thru 3 were conducted at 41 gpm with synthetic produced water at 25° C. (due to limitations of the Y-Strainer) and with initial polymer concentrations of 1,000, 5,000, and 10,000 ppm in Comparative Examples 1, 2, and 3, respectively. As in Examples 2 and 3, aliquots of the higher concentrations were manually diluted to 1,000 ppm after an idle period of five minutes.

The 1000 ppm polymer solutions were kept at 25° C. for 20 minutes before being analyzed by the FR test. During the 20 minutes, the 1000 ppm solutions were stirred with a "Jiffy Mixer" cage stirrer to simulate the turbulence that would be experienced by the polymer solution in the pipe down to the formation. Separate samples were stirred at two different speeds, 400 and 600 rpm, to simulate different flood water flow rates or different diameter piping with subsequently different turbulence.

None of the polymer solutions in Comparative Examples 1 thru 3 completed the FR test within one hour, regardless of the initial dilute latex polymer concentration or the subsequent stir speed. These results are shown in Table 2.

TABLE 1

Viscosity and FR results for inverted w/o latex of Examples 1-4.

| Parameter | Comparative Example No. | | |
|---|---|---|---|
| | 1 | 2 | 3 |
| Polymer Conc., initial (ppm) | 1,000 | 5,000 | 10,000 |
| Water Flow Rate (gpm) | 41 | 41 | 41 |
| Pressure Drop (psi) | 2 | 2 | 2 |
| Average Viscosity (cP) | 1.3 | 3.1 | 3.3 |
| Filter Ratio (400 RPM) | Fail | Fail | Fail |
| Filter Ratio (600 RPM) | Fail | Fail | Fail |

Examples 5-13

A one-stage offshore inversion process was simulated using synthetic produced water at 78° C. This water contained 94,000 ppm (9.4 wt %) total dissolved solids with a hardness equivalent to 9600 ppm of CaCO₃. An inversion device having a 2-inch diameter static mixer of variable length and baffle configuration was connected to the hot brine tank through a pump. A high pressure pump fed latex to an injection quill made from 0.375 inch stainless steel tubing cut off on a 45 degree angle and located directly ahead of the inversion device. In all cases, the pump rate was adjusted to provide a dilute latex with 2500 ppm polymer in the flowing brine. After the inversion device, the fluid was conveyed through a section of 2" diameter flexible hose of sufficient length to provide a 1-5 minute aging residence time before sample collection. This was intended to simulate the initial mixing of the polymer with the brine in the injection pipe.

The invertible latex was a conventional 30 mole % anionic inverse emulsion copolymer of sodium acrylate and acrylamide. In all cases except examples 12 and 13, the latex also contained about 2 wt. % of an alkoxylated alcohol non-ionic surfactant having an HLB of about 14 and less than 1 wt % of an ionic surfactant having an HLB above 20 to facilitate inversion. In Examples 12 and 13, the total amount of inverting surfactants was reduced by 20% (Example 12) and 10% (Example 13).

The simulation was run nine times as shown in Table 3 below employing various single static mixers. All FabTech mixers were obtained from Nalco FabTech LLC of Casper, Wyo. The 3' Koflo Mixer was obtained from the Koflo Corporation of Cary, Ill.

6' FabTech 90FR: 6 foot static mixer having about 6 mixing elements per foot wherein each subsequent element is rotated 90° axially with respect to the length of the pipe.

3' FT FabTech 90FR: 3 foot static mixer having about 6 mixing elements per foot wherein each subsequent element is rotated 90° axially with respect to the length of the pipe.

3' FT FabTech Inline: 3 foot static mixer having about 5 mixing elements per foot wherein each subsequent element is rotated 0° axially with respect to the length of the pipe.

Example 11 was conducted with a brine flow rate of 18.5 gpm, Examples 5, 7, 8, 9, 10, 12, and 13 were conducted at 49.5 gpm, and Example 6 was conducted with a brine flow rate of 74.25 gpm.

The 2500 ppm polymer solutions collected at the end of the hose were kept at 78° C. for 60 minutes before cooling to 23° C. and being analyzed by the FR test. During the 60 minutes, the 2500 ppm solutions were stirred with a "Jiffy Mixer" cage stirrer at 250 rpm to simulate the turbulence that would be experienced by the polymer solution in the pipe down to the formation in a particular application.

Examples 5 thru 11 and Example 13 all passed the FR test indicating successful injectivity into a formation. Results are shown in Table 3.

TABLE 3

Viscosity and Filter Ratio (FR) for Examples 5-13 after inversion using a single static mixer followed by 60 minutes stirring.

| Ex. No. | Brine Flow Rate (GPM) | 2" (5.08 cm) Diameter Static Mixer | Pressure Drop Across Mixer, psi ± 2 | Water Velocity in 2" Hose, m/s | Viscosity, cP ± 1 (6 rpm, 80° C.) | Filter Ratio |
|---|---|---|---|---|---|---|
| 5 | 49.5 | 6' Fabtech 90FR | 12 | 1.5 | 8.6 | 1.04 |
| 6 | 74.25 | 6' Fabtech 90FR | 24 | 2.4 | 11 | 1.04 |
| 7 | 49.5 | 6' Fabtech 90FR | 10 | 1.5 | 10.8 | 1.02 |
| 8 | 49.5 | 3' Koflo Mixer | 13 | 1.5 | 10.8 | 1.01 |
| 9 | 49.5 | 3' Fabtech inline | 6 | 1.5 | 10.5 | 1.01 |
| 10 | 49.5 | 3' Fabtech 90FR | 7 | 1.5 | 11.0 | 1.05 |
| 11 | 18.5 | 3' Fabtech 90FR | 2 | 0.6 | 10.9 | 1.03 |
| 12 | 49.5 | 3' Fabtech 90FR | 10 | 1.5 | 4.3 | Fail |
| 13 | 49.5 | 3' Fabtech 90FR | 10 | 1.5 | 11.0 | 1.03 |

Examples 14-15

A one-stage offshore inversion process was simulated using synthetic produced water at 77° C. The experiment was conducted to represent injection and inversion within a side-stream pipe that subsequently re-joins the main flow of flood water. In this example, a pump was used as a mixing device, by feeding both a brine and a latex stream into the same pump. The produced water contained 94,000 ppm (9.4 wt %) total dissolved solids with a hardness equivalent to 9600 ppm of $CaCO_3$. An inversion device consisting of a dual stage centrifugal pump located within a Nalco EGM G2010 10/30 ratio-controlled polymer feeder (obtained from the Nalco Company of Naperville, Ill.) was connected to a latex tank and the tank of produced water.

The invertible latex included a 70/30 mol/mol acrylamide/sodium acrylate copolymer in a conventional w/o latex, to which was added about 2 wt % of an alkoxylated alcohol non-ionic surfactant having an HLB of about 14 and less than 1 wt % of an ionic surfactant having an HLB above 20 to facilitate inversion.

Examples 14 and 15 employed a brine feed at 50 gpm. Latex was applied to yield a dilute latex polymer concentration of 7,500 ppm to take advantage of the concentration effect and simulate injection of latex into a side-stream of the flood water. A sample of the dilute latex was then further diluted manually at a ratio of 1:3 dilute latex to produced water, using the synthetic produced water at 77° C. to yield a 2500 ppm polymer solution.

For Example 14, the dilute latex was collected immediately after the inversion device and the 1 to 3 dilution was performed with a residence time of less than 30 seconds. For Example 15, the dilute latex was collected after passing through an additional four feet of 4" static mixer and 150 feet of 2" diameter hose. The 1 to 3 dilution was performed with a residence time of about 60 seconds.

The 2500 ppm polymer solutions were kept at 80° C. for 60 minutes before being analyzed by Brookfield viscosity. During the 60 minutes, the 2500 ppm solutions were stirred with a "Jiffy Mixer" cage stirrer at 400 rpm to simulate the turbulence that would be experienced by the polymer solution in the pipe down to the formation in a particular application. A target viscosity of 10 cP was expected for the 2500 ppm polymer solution at 80° C., based upon laboratory calibration standards.

After this processing, the diluted product of Example 14 had a Brookfield viscosity 10.2 cP (at 7 $s^{-1}$ shear rate) after the one hour period. The diluted product of Example 15 had a Brookfield viscosity 9.6 cP (at 7 s$^{-1}$ shear rate) after the one hour period.

The Brookfield viscosity results show that the mixing action of the EGM feeder, combined with the simulated flow and residence time provided within an injection pipe, was sufficient to form a polymer solution. The additional static mixer provided no additional benefit.

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

The invention claimed is:

1. A method of inverting a water-in-oil latex, the method comprising
   a. providing a single inversion device comprising at least one inlet and an outlet, the device designed and adapted to provide a pressure drop of about 2 psi to 150 psi between at least an inlet and the outlet;
   b. applying a water-in-oil latex source to an inlet of the inversion device, the latex comprising about 10 wt % to 80 wt % of a water soluble polymer having a weight average molecular weight of about 1,000,000 to 100,000,000 g/mole;
   c. applying a water source to an inlet of the inversion device;
   d. combining the latex with the water source within the inversion device to form a dilute polymer latex comprising about 10,000 ppm or less of the water soluble polymer; and
   e. dispensing the dilute polymer latex from the inversion device,
   wherein the dispensed dilute polymer latex forms a polymer solution having a viscosity of about 80% to 100% of an expected viscosity of the polymer solution in the absence of shear.

2. The method of claim 1 wherein the inversion device is a static mixer.

3. The method of claim 1 wherein the inversion device is a mixing pump.

4. The method of claim 1 wherein the latex source and the water source are applied to different inlets.

5. The method of claim 1 wherein the inversion device is characterized by the absence of mixing elements.

6. The method of claim 5 wherein the inversion device comprises a first conduit having one or more inlets and outlets; a second conduit having one or more inlets and outlets, wherein said first conduit secures to said second conduit and traverses said second conduit; a chamber that has one or more inlets and outlets, wherein said second conduit secures to said chamber and wherein said first conduit outlets and said second conduit outlets are in fluid communication with said chamber inlets, wherein the device is adapted to provide a pressure drop of about 2 psi to 150 psi between the second conduit inlets and the chamber outlets of the device.

7. The method of claim 6 wherein the latex and water are combined in the chamber of the inversion device.

8. The method of claim 1 wherein the latex comprises about 2 wt % to 5 wt % of a surfactant having an HLB of about 14 or greater.

9. The method of claim 1 wherein about 0.1 second to 180 minutes after the combining, the polymer solution has a Filter Ratio of about 1.5 or less.

10. The method of claim 1 wherein the water source is a high temperature water source, a high total dissolved solids water source, or a high temperature/high total dissolved solids water source.

11. An inversion system comprising:
    a. a single inversion device, the inversion device comprising at least one inlet and an outlet, the device designed and adapted to provide a pressure drop of about 2 psi to 150 psi between at least one inlet and the outlet;
    b. a water-in-oil latex source fluidly connected to an inlet, the latex comprising about 10 wt % to 80 wt % of a water soluble polymer having a weight average molecular weight of about 1,000,000 to 100,000,000 g/mole;
    c. a water source fluidly connected to an inlet, the water source being a high temperature water source, a high total dissolved solids water source, or a high temperature/high total dissolved solids water source; and
    d. a polymer solution in fluid communication with the outlet, the polymer solution comprising about 10,000 ppm or less of the polymer and having a viscosity about 80% to 100% of an expected viscosity of the polymer solution in the absence of shear
    and characterized by a filter ratio of about 1.5 or less.

12. The inversion system of claim 11, wherein the inversion device is a static mixer.

13. The inversion system of claim 11, wherein the inversion device is a mixing pump.

14. The inversion system of claim 11, wherein the inversion device is characterized by the absence of mixing elements.

15. The inversion system of claim 14 wherein the inversion device comprises a first conduit having one or more inlets and outlets; a second conduit having one or more inlets and outlets, wherein said first conduit secures to said second conduit and traverses said second conduit; a chamber that has one or more inlets and outlets, wherein said second conduit secures to said chamber and wherein said first conduit outlets and said second conduit outlets are in fluid communication with said chamber inlets, wherein the device is adapted to provide a pressure drop of about 2 psi to 150 psi between the second conduit inlets and the chamber outlets of the device.

16. The inversion system of claim 14 further comprising one or more static mixers, one or more pumps, or both disposed in fluid communication with and downstream from the inversion device.

17. The inversion system of claim 11 wherein the inversion device is arranged in-line with or on a bypass of a flow of the water source toward a subterranean reservoir.

* * * * *

UNITED STATES PATENT AND TRADEMARK OFFICE
CERTIFICATE OF CORRECTION

PATENT NO. : 10,047,274 B2
APPLICATION NO. : 15/152852
DATED : August 14, 2018
INVENTOR(S) : Zachary Wilson Logan et al.

Page 1 of 1

It is certified that error appears in the above-identified patent and that said Letters Patent is hereby corrected as shown below:

On the Title Page

(54) and in the Specification, Column 1 Lines 1-2, "APPARATUS AND METHOD FOR INVERTING POLYMER LATICES" should be - APPARATUS AND METHOD FOR INVERTING POLYMER LATTICES -

Signed and Sealed this
Twenty-first Day of May, 2019

Andrei Iancu
*Director of the United States Patent and Trademark Office*